United States Patent
Min

(10) Patent No.: US 8,780,827 B2
(45) Date of Patent: Jul. 15, 2014

(54) APPARATUS AND METHOD FOR ALLOCATING RESOURCE IN MULTI-CARRIER SYSTEM

(75) Inventor: Seung-Hyun Min, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 546 days.

(21) Appl. No.: 13/038,823

(22) Filed: Mar. 2, 2011

(65) Prior Publication Data

US 2011/0216721 A1 Sep. 8, 2011

(30) Foreign Application Priority Data

Mar. 3, 2010 (KR) ........................ 10-2010-0018815

(51) Int. Cl.
*H04W 4/00* (2009.01)
*H04J 1/00* (2006.01)
*H04W 72/00* (2009.01)
*H04W 72/08* (2009.01)
*H04W 88/08* (2009.01)

(52) U.S. Cl.
CPC ............ *H04W 72/085* (2013.01); *H04W 88/08* (2013.01)
USPC ...... 370/329; 370/343; 455/422.1; 455/452.1

(58) Field of Classification Search
None
See application file for complete search history.

(56) References Cited

U.S. PATENT DOCUMENTS

| 2009/0154419 A1* | 6/2009 | Yoshida et al. | 370/330 |
| 2010/0329199 A1* | 12/2010 | Liu et al. | 370/329 |
| 2011/0022714 A1* | 1/2011 | Nobukiyo | 709/226 |
| 2011/0275399 A1* | 11/2011 | Englund et al. | 455/513 |

FOREIGN PATENT DOCUMENTS

WO   WO 2009116489 A1 *  9/2009
WO   WO 2009122776 A1 * 10/2009

* cited by examiner

*Primary Examiner* — Faruk Hamza
*Assistant Examiner* — Cassandra Decker
(74) *Attorney, Agent, or Firm* — Jefferson IP Law, LLP

(57) ABSTRACT

An apparatus and method in which a Base Station (BS) allocates consecutive frequency-domain resources to a Mobile Station (MS) in the multi-carrier system are provided. The method includes sorting all MSs that participate in scheduling for each resource block in a descending order according to priority, selecting an MS including top priority as a best MS among MSs each of which includes top priority for each resource block, allocating a corresponding resource block to the selected best MS, and additionally allocating a corresponding resource block to the best MS if the best MS exists within a window preset in an adjacent resource block located in directions of at least one of decreasing and increasing a resource block index with respect to the allocated resource block, wherein the window includes a specific number of MSs including top priority, where the specific number is based on the window size.

12 Claims, 5 Drawing Sheets

APPARATUS AND METHOD FOR ALLOCATING RESOURCE IN MULTI-CARRIER SYSTEM

PRIORITY

This application claims the benefit under 35 U.S.C. §119 (a) of a Korean patent application filed in the Korean Intellectual Property Office on Mar. 3, 2010 and assigned Serial No. 10-2010-0018815, the entire disclosure of which is hereby incorporated by reference.

BACKGROUND OF THE INVENTION

1. Field of the Invention

The present invention relates to an apparatus and method for resource allocation in a multi-carrier system. More particularly, the present invention relates to an apparatus and method in which a Base Station (BS) allocates consecutive frequency-domain resources to a Mobile Station (MS) in a multi-carrier system.

2. Description of the Related Art

In a multi-carrier system such as a Long Term Evolution (LTE) system, a Base Station (BS) may selectively allocate not only time-domain resources but also frequency-domain resources to a Mobile Station (MS). In doing so, spectral efficiency may be increased by effectively using the time-domain and frequency-domain resources.

Meanwhile, in a case of uplink resource allocation of the LTE system, unlike other multi-carrier systems, there is a restriction in that resources to be allocated to one MS must be consecutive in the frequency domain.

FIG. 1 illustrates an uplink resource allocation method of a BS in an LTE system according to the related art.

Referring to FIG. 1, it is assumed that resource blocks 0 to 7 exist as frequency-domain resources, and the BS allocates the resource blocks to four MSs A, B, C, and D through scheduling. The BS sorts the four MSs A, B, C, and D that participate in the scheduling for each resource block in a descending order according to a channel property. Accordingly, MSs having the best channel property are allocated respectively to the resource blocks 0 to 7 in the order of B, B, A, A, C, A, D, and C.

The BS selects one MS having the best channel property, and allocates a corresponding resource block to the selected MS. Thereafter, among resource blocks adjacent to the allocated resource block, the BS determines whether there is a resource block having the selected MS as the MS having the best channel property. If the resource block exists, the BS additionally allocates the resource block to the selected MS, and if the resource block does not exist, the BS stops the additional resource allocation to the selected MS. Thereafter, the BS allocates resource blocks to the remaining MSs by using the same method.

In FIG. 1, the BS first allocates the resource block 3 to the MS A having the best channel property. Among resource blocks adjacent to the allocated resource block 3, there is the resource block 2 having the MS A as the MS having the best channel property. Thus, the BS additionally allocates the resource block 2 to the MS A. Then, since there is no resource block that has the MS A as the MS having the best channel property among the resource blocks adjacent to the allocated resource blocks 2 and 3, the BS stops the additional resource allocation to the MS A.

Thereafter, the BS allocates the resource block 1 to the MS B having the best channel property among the remaining MSs. Among resource blocks adjacent to the allocated resource block 1, there is the resource block 0 having the MS B as the MS having the best channel property. Thus, the BS additionally allocates the resource block 0 to the MS B. Then, since there is no resource block that has the MS B as the MS having the best channel property among the resource blocks adjacent to the allocated resource blocks 0 and 1, the BS stops the additional resource allocation to the MS B.

Likewise, the BS allocates the resource block 4 to the MS C having the best channel property among the remaining MSs. Since there is no resource block that has the MS C as the MS having the best channel property among the resource blocks adjacent to the allocated resource block 4, the BS stops the additional resource allocation to the MS C, and allocates the remaining resource blocks 5, 6, and 7 to the MS D.

In the resource allocation method having a restriction in that resources to be allocated to one MS have to be consecutive in the frequency domain as described above, there may be a case where not many resource blocks are allocated to an MS having a good channel property, which may lead to a problem of decreasing spectral efficiency. That is, although the MS A has the best channel property among the four MSs that participate in the scheduling in FIG. 1, not many resource blocks are allocated to the MS A. More particularly, although the MS A has the best channel property in the resource block 5, the resource block 5 cannot be allocated due to the restriction of consecutive allocation.

SUMMARY OF THE INVENTION

An aspect of the present invention is to address at least the above-mentioned problems and/or disadvantages and to provide at least the advantages described below. Accordingly, an aspect of the present invention is to provide an apparatus and method for resource allocation in a multi-carrier system.

Another aspect of the present invention is to provide an apparatus and method in which a Base Station (BS) allocates frequency-domain consecutive resources to a Mobile Station (MS) in a multi-carrier system.

Still another aspect of the present invention is to provide an apparatus and method in which a BS allocates many resource blocks to an MS having good channel property to increase spectral efficiency in a multi-carrier system.

Yet another aspect of the present invention is to provide an apparatus and method in which a BS in a multi-carrier system allocates a resource block by selecting an MS of which priority (e.g., channel property) is highest, and when an adjacent resource block is evaluated for additional resource block allocation, instead of considering only an MS having top priority for each resource block, sets a window so that if the selected MS exists within the window, a corresponding resource block is additionally allocated to the selected MS in a multi-carrier system.

A further aspect of the present invention is to provide an apparatus and method for reliably allocating resources by properly limiting a maximum number of resource blocks that may be allocated for each MS by a BS.

In accordance with an aspect of the present invention, a method for allocating a resource of a BS in a multi-carrier system is provided. The method includes sorting all MSs that participate in scheduling for each resource block in a descending order according to priority, selecting an MS including top priority as a best MS among MSs each of which includes top priority for each resource block, allocating a corresponding resource block to the selected best MS, and additionally allocating a corresponding resource block to the best MS if the best MS exists within a window preset in an adjacent resource block located in directions of at least one of decreasing and increasing a resource block index with respect to the allocated resource block, wherein the window includes a specific number of MSs including top priority, where the specific number is based on the window size.

In accordance with another aspect of the present invention, an apparatus for allocating a resource of a BS in a multi-carrier system is provided. The apparatus includes a priority determination unit for determining priority of all MSs that participate in scheduling for each resource block, and a resource allocation unit for sorting all MSs that participate in scheduling for each resource block in a descending order according to priority, for selecting an MS including top priority as a best MS among MSs each of which includes top priority for each resource block, for allocating a corresponding resource block to the selected best MS, and for additionally allocating a corresponding resource block to the best MS if the best MS exists within a window preset in an adjacent resource block located in directions of at least one of decreasing and increasing a resource block index with respect to the allocated resource block, wherein the window includes a specific number of MSs including top priority, where the specific number is based on the window size.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein may be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

Exemplary embodiments of the present invention provide a method for allocating a resource by a Base Station (BS) to a Mobile Station (MS) in a multi-carrier system having a restriction in which resources to be allocated to one MS are be consecutive in a frequency domain.

More particularly, exemplary embodiments of the present invention provide a method in which a resource block is allocated by selecting an MS of which priority (e.g., channel property) is highest, and when an adjacent resource block is evaluated for additional resource block allocation, instead of considering only an MS having top priority for each resource block, a window is set so that if the selected MS exists within the window, a corresponding resource block is additionally allocated to the selected MS.

Figure 1:
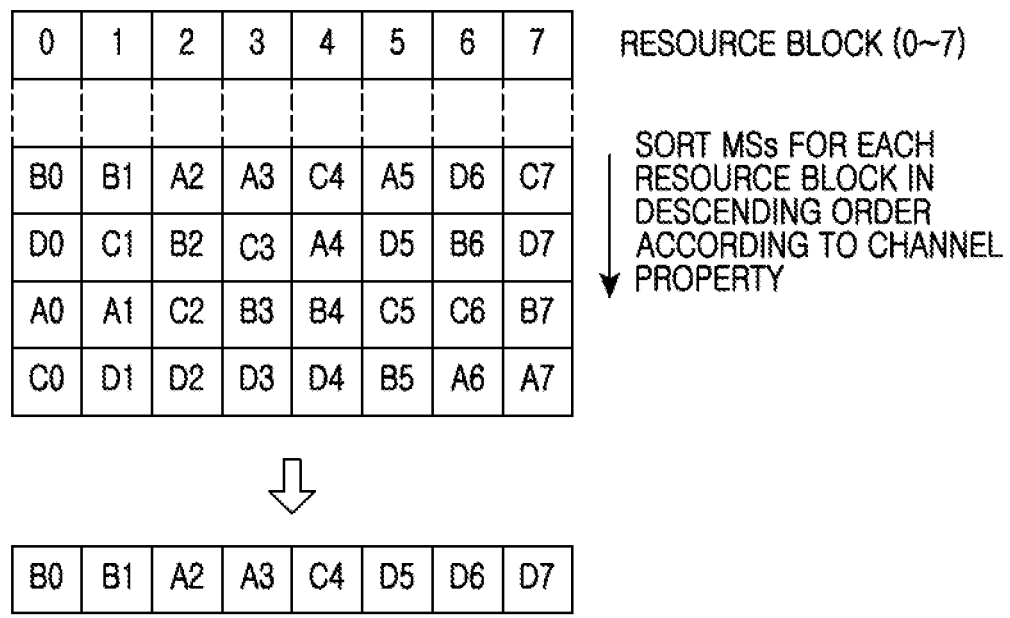
FIG. 1 illustrates an uplink resource allocation method of a Base Station (BS) in an Long Term Evolution (LTE) system according to the related art.
Figure 2:
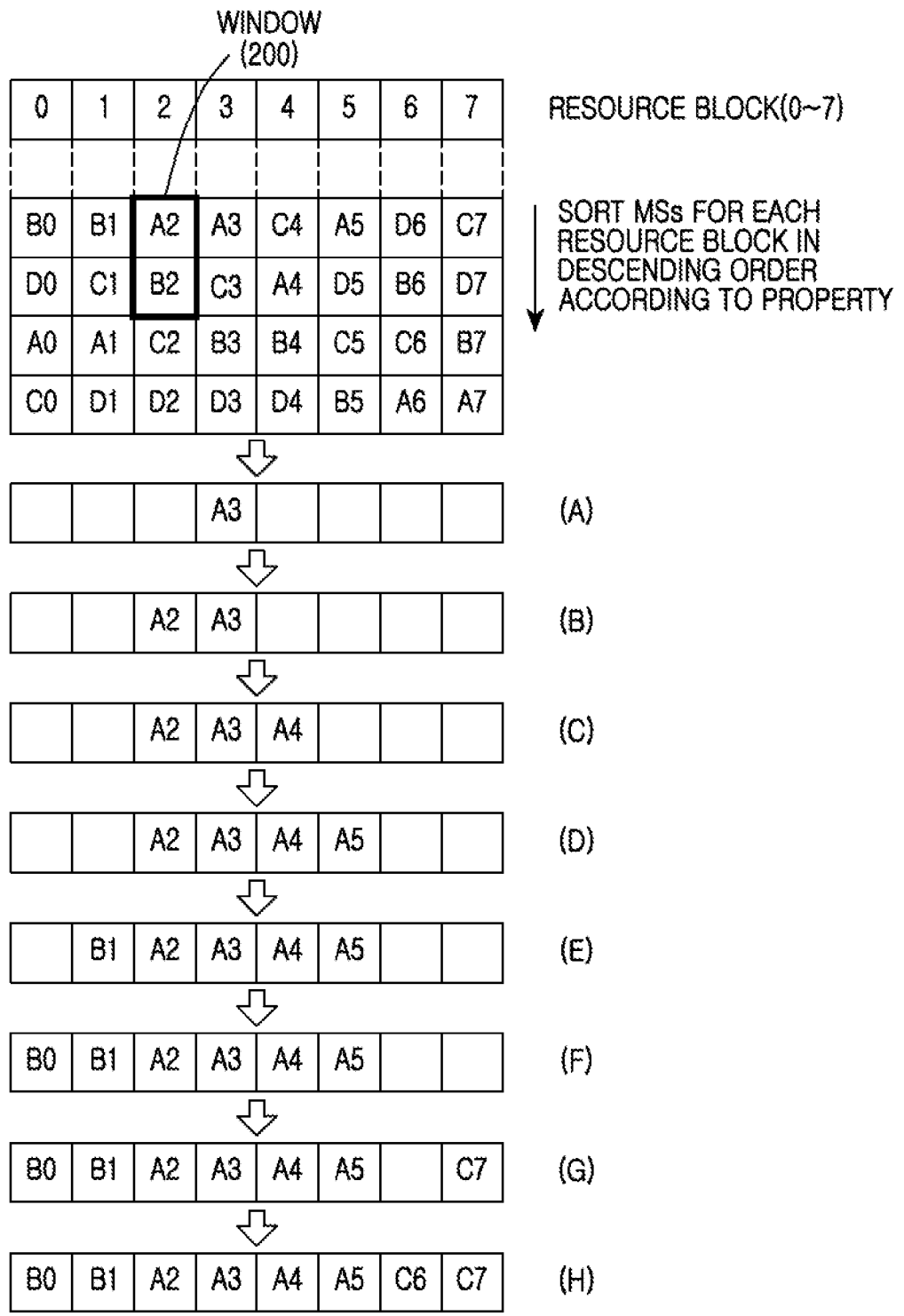
FIG. 2 illustrates an example of a resource allocation method of a BS in a multi-carrier system according to an exemplary embodiment of the present invention.

FIG. 2 illustrates an example of a resource allocation method of a BS in a multi-carrier system according to an exemplary embodiment of the present invention.

Referring to FIG. 2, it is assumed that resource blocks 0 to 7 exist as frequency-domain resources, and the BS allocates the resource blocks to four MSs A, B, C, and D through scheduling. The BS sorts the four MSs A, B, C, and D that participate in the scheduling for each resource block in a descending order according to priority (e.g., channel property). Accordingly, MSs having top priority are allocated respectively to the resource blocks 0 to 7 in the order of B, B, A, A, C, A, D, and C.

Among the MSs having top priority for the respective resource blocks, the BS selects an MS having top priority as the best MS, and allocates a corresponding resource block preferentially to the selected best MS. If it is assumed that the MS A (indicated by 'A3' in FIG. 2) of the resource block 3 has the top priority among the MSs having the top priority, the BS selects the MS A as the best MS, and allocates the resource block 3 preferentially to the MS A (see (A) of FIG. 2).

In addition, the BS determines whether the best MS exists within a window defined in an adjacent resource block located in a direction of decreasing a resource block index with respect to a resource block pre-allocated in a frequency domain. If the best MS exists, the BS additionally allocates a corresponding resource block to the best MS. If the best MS does not exist, the BS determines whether the best MS exists within a window defined in an adjacent resource block located in a direction of increasing the resource block index with respect to the resource block pre-allocated in the frequency domain. If the best MS exists, the BS additionally allocates a corresponding resource block to the best MS. If the best MS does not exist, the BS stops the additional resource block allocation to the best MS and removes the best MS from the MSs sorted for each resource block.

Herein, the window is an area including a specific number of MSs having top priority, where the specific number is based on a window size. The window may have a fixed size or a variable size for each resource block. For example, the window size may be set to a fixed number (e.g., 2) so that two top-priority MSs are included for each resource block. Alternatively, the window size may be set variably for each resource block in such a manner that a channel property of the best MS for a pre-allocated resource block is compared with a channel property of respective MSs, which are sorted in a descending order according to priority, for an adjacent resource block. If a difference of the comparison is within the range of a reference value (dB), an MS having such a channel property is included in the window size.

If it is assumed that a window size of a window 200 is fixed to 2, since the MS A exists within the window 200 defined in the adjacent resource block 2 located in a direction of decreasing a resource block index with respect to the pre-allocated resource block 3, the resource block 2 is additionally allocated to the MS A (see (B) of FIG. 2). Thereafter, although the MS A does not exist within the window 200 defined in the adjacent resource block 1 located in a direction of decreasing a resource block index with respect to pre-allocated resource blocks 2 and 3, since the MS A exists within the window 200 defined in the adjacent resource block 4 located in a direction of increasing a resource block index with respect to the pre-allocated resource blocks 2 and 3, the BS additionally allocates the resource block 4 to the MS A (see (C) of FIG. 2). In addition, since the MS A exists within the window 200 defined in the adjacent resource block 5 located in a direction of increasing a resource block index with respect to the pre-allocated resource blocks 2, 3, and 4, the BS additionally allocates the resource block 5 to the MS A (see (D) of FIG. 2). Thereafter, since the MS A does not exist within the window 200 defined in the adjacent resource block 6 located in a direction of increasing a resource block index with respect to the pre-allocated resource blocks 2, 3, 4, and 5, the BS stops additionally resource block allocation to the MS A, and removes the MS A from the MSs sorted for each resource block.

Thereafter, the BS allocates resource blocks to the remaining MSs by using the same method described above based on the MSs sorted for each resource block and excluding the MS A. If it is assumed that the MS B of the resource block 1 is an MS having the top priority among the MSs having the top priority for each resource block, based on the MSs sorted for each resource block and excluding the MS A, the BS allocates the resource block 1 to the MS B (see (E) of FIG. 2). Thereafter, since the MS B exists within the window 200 defined in the adjacent resource block 0 located in a direction of decreasing a resource block index with respect to the pre-allocated resource block 1, the BS additionally allocates the resource block 0 to the MS B (see (F) of FIG. 2). Thereafter, since there is no adjacent resource block not yet allocated in a direction of decreasing or increasing a resource block index with respect to the pre-allocated resource blocks 0 and 1, the BS stops additional resource block allocation to the MS B, and removes the MS B from the MSs sorted for each resource block.

Thereafter, if it is assumed that MS C of the resource block 7 is the MS having the top priority among the MSs having the top priority for each resource block, based on the MSs sorted for each resource block and excluding the MSs A and B, the BS allocates the resource block 7 to the MS C (see (G) of FIG. 2). Since resources are allocated based on the MSs sorted for each resource block in a state of removing the MSs A and B, the MS D and the MS C exist within the window 200 defined in the adjacent resource block 6. Thereafter, since the MS C exists within the window 200 defined in the adjacent resource block 6 located in a direction of decreasing a resource block index with respect to the pre-allocated resource block 7, the BS additionally allocates the resource block 6 to the MS C (see (H) of FIG. 2).

By using the resource allocation according to an exemplary embodiment of the present invention, the BS may allocate a greater number of resource blocks to the MS A having a good channel property in comparison with a conventional resource allocation method.

Additionally, an exemplary embodiment of the present invention implements a highly reliable resource allocation method by properly limiting a maximum number of resource blocks that may be allocated for each MS. In an Long Term Evolution (LTE) system for example, power that may be used by an MS in an uplink transmission is proportional to the number of resource blocks allocated to that MS. In this case, if transmission power of the MS reaches maximum power transmissible by the MS, a transmission power value per resource block decreases, which results in decreased reliability of resource allocation.

Therefore, an exemplary embodiment of the present invention provides a method for limiting the maximum number of resource blocks that may be allocated, to provide a Modulation and Coding Scheme (MCS) level capable of guaranteeing performance while maintaining good spectral efficiency. In a situation where the transmission power of the MS is the maximum power transmissible by the MS, if the MS transmits the resource block and the BS may measure a reception Signal to Interference plus Noise Ratio (SINR) for the transmitted resource block, resource blocks may be additionally allocated to the MS by a ratio of an estimated reception SINR obtained through the measurement and an SINR required to satisfy a target MCS level to be provided to the MS. Therefore, the maximum number of resource blocks that may be allocated for each MS is determined by using a power headroom of the MS, an estimated SINR, and an SINR that satisfies a target MCS level.

It is assumed herein that the BS receives information regarding power that may be additionally used in uplink transmission, that is, a power headroom, from the MS.

First, an allowable number of resource blocks, that is, the maximum number of resource blocks that may be allocated to an $MS_k$ by considering only the power headroom, may be determined by Equation (1) below.

$$\text{allowable } RB_k = PHR_k(\text{linear scale}) * RB_k \quad \text{Equation (1)}$$

In Equation (1), $PHR_k$ denotes a power headroom reported from an $MS_k$. $RB_k$ denotes the number of resource blocks used by the $MS_k$ when the $PHR_k$ is reported from the $MS_k$. In addition, $SINR_k$ denotes an estimated reception SINR acquired for the $MS_k$ by the BS by measuring a channel property, and $SINR_{reference}$ denotes an SINR required to satisfy an MCS level capable of maximizing spectral efficiency. Herein, the allowable $RB_k$ is determined by a product between the $RB_k$ and a value obtained by converting the $PHR_k$ reported from the $MS_k$ in a linear scale. Instead of the $PHR_k$, the value obtained by converting the $PHR_k$ in the linear scale may be reported from the $MS_k$ to the BS. The allowable $RB_k$ determined by using Equation (1) above is the maximum number of resource blocks that may be used by the $MS_k$ while maintaining power spectral density with maximum transmission power. When the resource block is transmitted using the allowable $RB_k$, an estimated reception SINR of the $MS_k$ is denoted by $SINR_k$.

Since more resource blocks may be allocated with the same power if a channel environment is good, an exemplary embodiment of the present invention determines the allowable $RB_k'$, that is, the maximum number of resource blocks that may be allocated to the $MS_k$, by additionally considering a channel environment, that is, an SINR, as well as the $PHR_k$. That is, as illustrated in Equation (2) below, an allowable $RB_k'$, i.e., the maximum number of resource blocks that may be allocated to the $MS_k$, may be determined by the product between the allowable $RB_k$ determined using Equation (1) above and a ratio of the $SINR_k$ and the $SINR_{reference}$.

$$\text{allowable } RB_k' = \text{allowable } RB_k * SINR_k / SINR_{reference} \quad \text{Equation (2)}$$

Herein, the allowable RBk' determined using Equation (2) above is the maximum number of resource blocks that may be allocated with an MCS level that maximizes spectral efficiency.

Figure 3A:
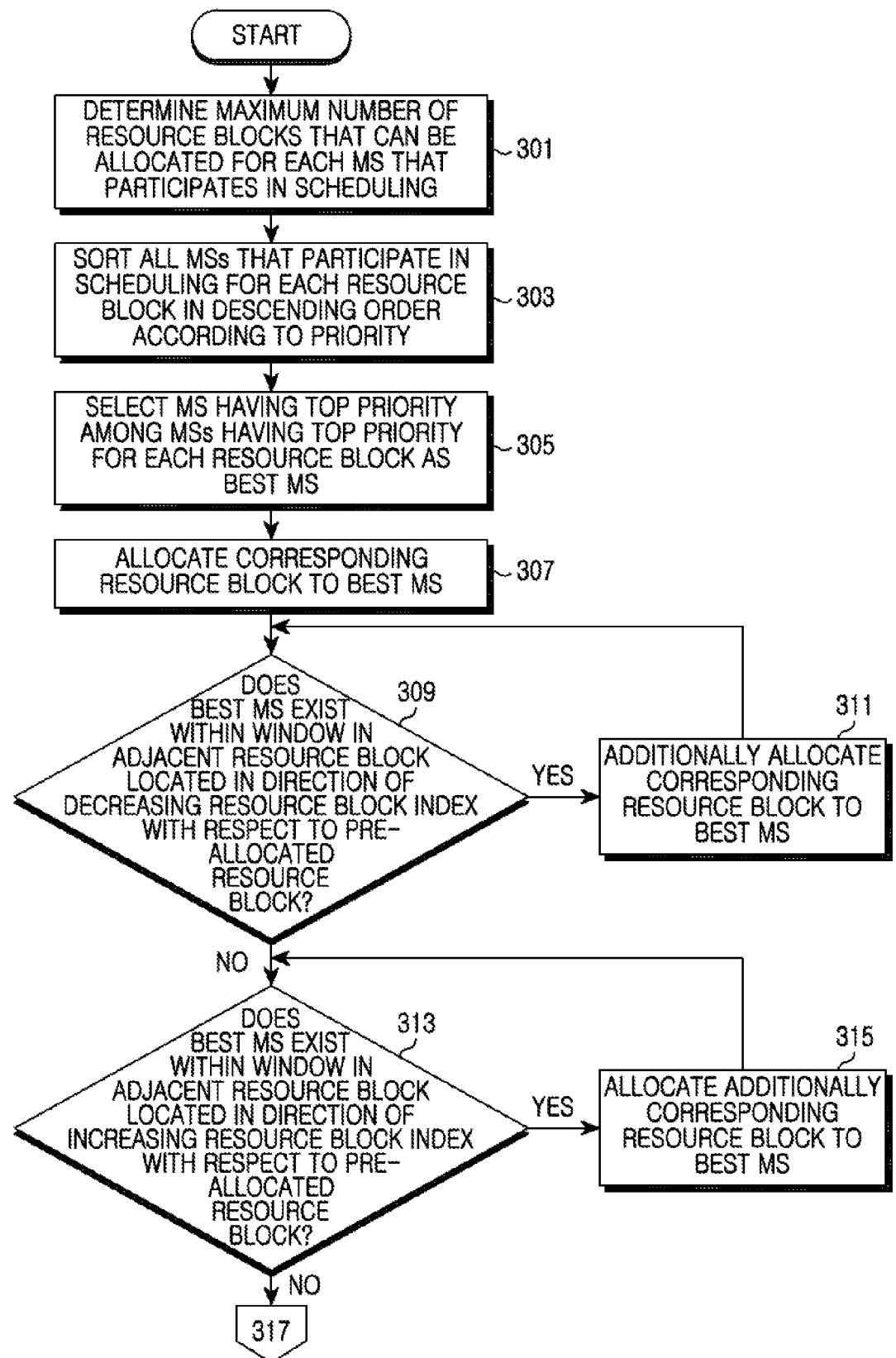
FIGS. 3A and 3B are flowcharts illustrating a resource allocation method of a BS in a multi-carrier system according to an exemplary embodiment of the present invention.
Figure 3B:
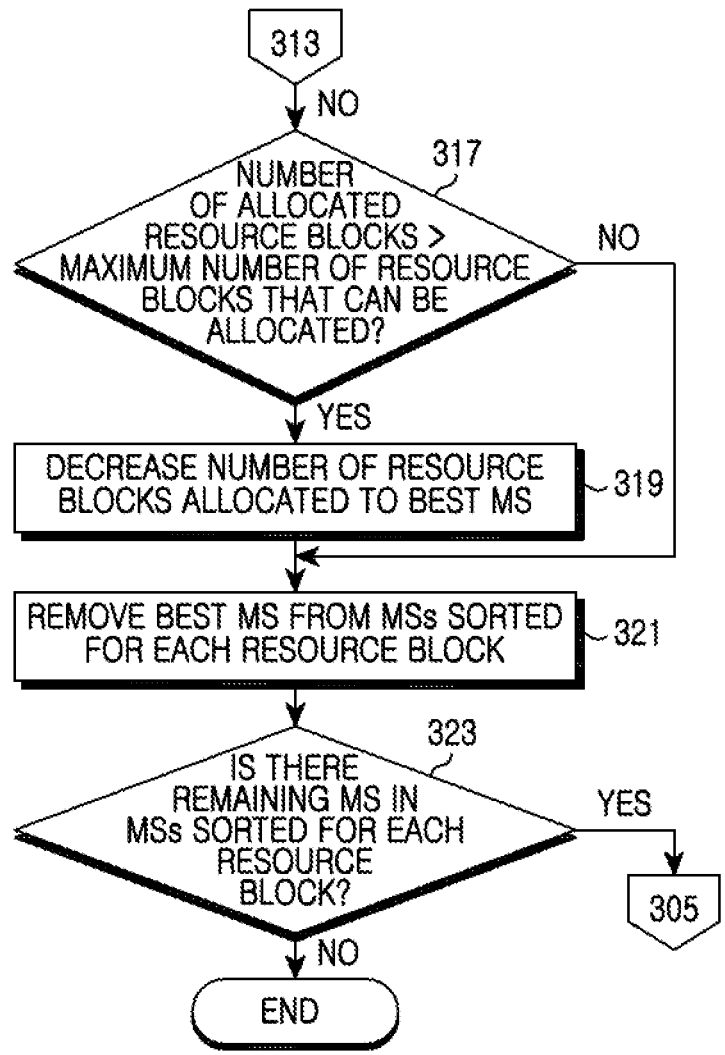

FIGS. 3A and 3B are flowcharts illustrating a resource allocation method of a BS in a multi-carrier system according to an exemplary embodiment of the present invention.

Referring to FIG. 3A, the BS determines the maximum number of resource blocks that may be allocated for each MS that participates in scheduling in step 301. Herein, the maximum number of resource blocks that may be allocated for each MS is determined based on Equation (1) and Equation (2) above. That is, the maximum number of resource blocks that may be allocated for each MS is determined by using a power headroom per MS, an estimated SINR, and an SINR that satisfies a target MCS level.

In step 303, the BS sorts all MSs that participate in the scheduling for each resource block in a descending order according to priority (e.g., channel property).

In step 305, the BS selects an MS having top priority as a best MS among the MSs each of which has the top priority for each resource block.

In step 307, the BS allocates a corresponding resource block to the selected best MS.

In step 309, the BS determines whether the best MS exists within a window in an adjacent resource block located in a direction of decreasing a resource block index with respect to a pre-allocated resource block.

If it is determined in step 309 that the best MS exists within the window in the adjacent resource block located in the direction of decreasing the resource block index with respect to the pre-allocated resource block, the BS additionally allocates the corresponding resource block to the best MS in step 311. Then, at step 309, the subsequent steps are repeated.

Otherwise, if it is determined in step 309 that the best MS does not exist within the window in the adjacent resource block located in the direction of decreasing the resource block index with respect to the pre-allocated resource block, the BS determines whether the best MS exists within a window in an adjacent resource block located in a direction of increasing the resource block index with respect to the pre-allocated resource block in step 313.

If it is determined in step 313 that the best MS exists within the window in the adjacent resource block located in the direction of increasing the resource block index with respect to the pre-allocated resource block, the BS additionally allocates the corresponding resource block to the best MS in step 315. Then, at step 313, the subsequent steps are repeated.

Otherwise, if it is determined in step 313 that the best MS does not exist within the window in the adjacent resource block located in the direction of increasing the resource block index with respect to the pre-allocated resource block, the BS stops additional resource block allocation to the best MS, and the procedure proceeds to step 317.

Referring to FIG. 3B, in step 317, the BS determines whether the number of resource blocks allocated to the best MS is greater than the maximum number of resource blocks that may be allocated to the best MS.

If it is determined in step 317 that the number of resource blocks allocated to the best MS is greater than the maximum number of resource blocks that may be allocated to the best MS, the BS decreases the number of resource blocks allocated to the best MS in step 319. That is, some of the resource blocks allocated to the best MS are de-allocated so that resource blocks may be allocated to the best MS by the maximum number of resource blocks that may be allocated to the best MS. In step 321, the BS removes the best MS from the MSs sorted for each resource block.

A method for allocating resource blocks to the best MS by the maximum number of resource blocks that may be allocated to the best MS by decreasing the number of resource blocks allocated to the best MS will be described in more detail below.

In an exemplary implementation, some resource blocks may be allocated to the best MS by the maximum number of resource blocks that may be allocated, symmetrically about a first allocated resource block among resource blocks allocated to the best MS, and the remaining resource blocks may be de-allocated. In another exemplary implementation, some resource block may be allocated to the best MS by the maximum number of resource blocks that may be allocated, symmetrically about a resource block having the smallest resource block index among the resource blocks allocated to the best MS, and the remaining resource blocks may be de-allocated. In a further exemplary implementation, the same number of resource blocks may be allocated symmetrically to both sides of a resource block having a medium resource block index among the resource blocks allocated to the best MS, some resource blocks may be allocated to the best MS by the maximum number of resource blocks that may be allocated, and the remaining resource blocks may be de-allocated. In this case, if it is impossible to allocate the same number of resource blocks to both sides, resource blocks are allocated to the best MS starting from a side where a smaller number of resource blocks are not pre-allocated.

On the other hand, if it is determined in step 317 that the number of resource blocks allocated to the best MS is not greater than the maximum number of resource blocks that may be allocated to the best MS, the BS removes the best MS from the MSs sorted for each resource block in step 321.

In step 323, the BS determines whether there is a remaining MS in the MSs sorted for each resource block.

If it is determined in step 323 that there is a remaining MS in the MSs sorted for each resource block, the BS returns to step 305 and the subsequent steps are repeated based on the MSs sorted for each resource block and excluding the best MS.

Otherwise, if it is determined in step 323 that there is no remaining MS in the MSs sorted for each resource block, the BS determines that resource allocation is complete for all MSs that participate in the scheduling. Then, the procedure of FIG. 3 ends.

Figure 4:
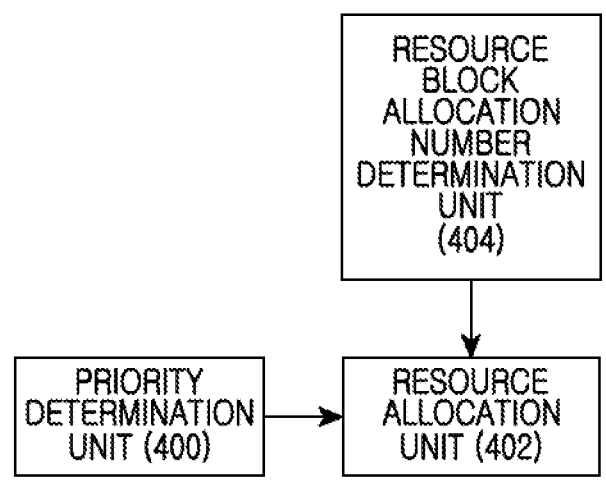
FIG. 4 is a block diagram illustrating a resource allocation apparatus of a BS in a multi-carrier system according to an exemplary embodiment of the present invention.

FIG. 4 is a block diagram illustrating a resource allocation apparatus of a BS in a multi-carrier system according to an exemplary embodiment of the present invention.

Referring to FIG. 4, the resource allocation apparatus of the BS includes a priority determination unit 400, a resource allocation unit 402, and a resource block allocation number determination unit 404.

The priority determination unit 400 determines priority (e.g., channel property) of all MSs that participate in scheduling for each resource block.

The resource allocation unit 402 sorts the MSs that participate in the scheduling for each resource block in a descending order according to priority (e.g., channel property) determined by the priority determination unit 400. Thereafter, the resource allocation unit 402 selects an MS having the top priority as a best MS among the MSs each of which has the top priority for each resource block, and allocates a corresponding resource block preferentially to the selected best MS. In addition, the resource allocation unit 402 determines whether the best MS exists within a window defined in an adjacent resource block located in a direction of decreasing a resource block index with respect to a resource block pre-allocated in a frequency domain. If the best MS exists, the resource allocation unit 402 additionally allocates the corresponding resource block to the best MS. If the best MS does not exist, the resource allocation unit 402 determines whether the best MS exists within a window defined in an adjacent resource block located in a direction of increasing the resource block index with respect to the resource block pre-allocated in the frequency domain. If the best MS exists, the resource allocation unit 402 additionally allocates the corresponding resource block to the best MS. If the best MS does not exist, the resource allocation unit 402 stops the additional resource block allocation to the best MS, and removes the best MS from the MSs sorted for each resource block. Thereafter, the resource allocation unit 402 allocates resource blocks to the remaining MSs by using the same method described above based on the MSs sorted for each resource block and excluding the best MS.

The resource block allocation number determination unit 404 determines the maximum number of resource blocks that may be allocated for each MS that participates in the scheduling, and provides the determined number to the resource allocation unit 402. Herein, the maximum number of resource blocks that may be allocated for each MS is determined based on Equation (1) and Equation (2) above. That is, the maximum number of resource blocks that may be allocated for each MS is determined by using a power headroom per MS, an estimated SINR, and an SINR that satisfies a target MCS level.

According to exemplary embodiments of the present invention, a BS of a multi-carrier system allocates a resource block by selecting an MS of which priority (e.g., channel property) is highest. When an adjacent resource block is evaluated for additional resource block allocation, instead of considering only an MS having the top priority for each resource block, sets a window so that if the selected MS exists within the window, a corresponding resource block is additionally allocated to the selected MS. Therefore, there is an advantage in that spectral efficiency may be increased by allocating many resource blocks by the BS to an MS having good channel property. In addition, another advantage is that resources may be reliably allocated by properly limiting the maximum number of resource blocks that may be allocated for each MS by the BS.

While the present invention has been shown and described with reference to certain exemplary embodiments thereof, it will be understood by those skilled in the art that various changes in form and details may be made therein without departing from the spirit and scope of the present invention as defined by the appended claims and their equivalents.

What is claimed is:

1. A method for allocating a resource of a Base Station (BS) in a multi-carrier system, the method comprising:

sorting all Mobile Stations (MSs) that participate in scheduling for each frequency domain resource block in a descending order according to priority;

selecting an MS including a top priority for a frequency domain resource block as a first best MS among MSs each of which includes a top priority for a respectively corresponding frequency domain resource block;

allocating the corresponding frequency domain resource block to the selected first best MS; and additionally allocating another corresponding resource block, adjacent to the allocated resource block and among resource blocks not yet allocated, to the first best MS if the first best MS falls within a priority window preset in the another corresponding resource block which is an adjacent resource block located in directions at least one of decreasing and increasing a resource block index in the frequency domain with respect to the allocated resource block, wherein the priority window includes a specific number of at least two MSs in the descending order according to priority, where the specific number is based on the priority window size.

2. The method of claim 1, wherein the priority window size is one of variably set for each resource block in such a manner that a channel property of the first best MS for an allocated resource block is compared with a channel property of respective MSs, which are sorted in the descending order according to priority, for an adjacent resource block, and if a difference of the comparison is within the range of a reference value (dB), an MS including such a channel property is included in the priority window, and fixedly set for each resource block.

3. The method of claim 1, further comprising:

removing the first best MS from the MSs sorted for each resource block if the first best MS does not fall within the priority window preset in the adjacent resource block located in directions of at least one of decreasing and increasing the resource block index in the frequency domain with respect to the allocated resource block; and if a remaining MS exists among the MSs sorted for each resource block, selecting a remaining MS including the top priority, for a respective resource block not yet allocated, as the best remaining MS among the MSs each of which includes the top priority for each respectively corresponding frequency domain resource block, based on the MSs sorted for each resource block and excluding the first best MS.

4. The method of claim 1, further comprising:

determining a maximum number of resource blocks that are allocatable for each MS that participates in the scheduling; and decreasing the number of resource blocks allocated to the first best MS, if the number of resource blocks allocated to the first best MS is greater than the maximum number of resource blocks that are allocatable to the first best MS.

5. The method of claim 4, wherein the maximum number of resource blocks that are allocatable for each MS is determined by using at least one of a power headroom per MS, an estimated Signal to Interference plus Noise Ratio (SINR), and an SINR that satisfies a target Modulation and Coding Scheme (MCS) level.

6. The method of claim 1, wherein the multi-carrier system comprises a system including a restriction such that resources to be allocated to one MS are consecutive in a frequency domain.

7. An apparatus for allocating a resource of a Base Station (BS) in a multi-carrier system, the apparatus comprising:
- a priority determination unit for determining priority of all Mobile Stations (MSs) that participate in scheduling for each frequency domain resource block; and
- a resource allocation unit for sorting all MSs that participate in scheduling for each frequency domain resource block in a descending order according to priority, for selecting an MS including a top priority for a frequency domain resource block as a first best MS among MSs each of which includes a top priority for a respectively corresponding frequency domain resource block, for allocating the corresponding frequency domain resource block to the selected first best MS, and for additionally allocating another corresponding resource block, adjacent to the allocated resource block and among resource blocks not yet allocated, to the first best MS if the first best MS falls within a priority window preset in the another corresponding resource block which is an adjacent resource block located in directions of at least one of decreasing and increasing a resource block index in the frequency domain with respect to the allocated resource block,
- wherein the priority window includes a specific number of at least two MSs in the descending order according to priority, where the specific number is based on the priority window size.

8. The apparatus of claim 7, wherein the priority window size is one of variably set for each resource block in such a manner that a channel property of the first best MS for an allocated resource block is compared with a channel property of respective MSs, which are sorted in the descending order according to priority, for an adjacent resource block, and if a difference of the comparison is within the range of a reference value (dB), an MS including such a channel property is included in the priority window, and fixedly set for each resource block.

9. The apparatus of claim 7, wherein the resource allocation unit removes the first best MS from the MSs sorted for each resource block if the first best MS does not fall within the priority window preset in the adjacent resource block located in directions of at least one of decreasing and increasing the resource block index in the frequency domain with respect to the allocated resource block, and if a remaining MS exists among the MSs sorted for each resource block, selects the remaining MS including top priority, for a respective resource block not yet allocated, as the best remaining MS among the MSs each of which includes top priority for each respectively corresponding frequency domain resource block, based on the MSs sorted for each resource block and excluding the first best MS.

10. The apparatus of claim 7, further comprising:
- a resource block allocation number determination unit for determining a maximum number of resource blocks that are allocatable for each MS that participates in the scheduling,
- wherein the resource allocation unit decreases the number of resource blocks allocated to the first best MS, if the number of resource blocks allocated to the first best MS is greater than the maximum number of resource blocks that are allocatable to the first best MS.

11. The apparatus of claim 10, wherein the maximum number of resource blocks that are allocatable for each MS is determined by using at least one of a power headroom per MS, an estimated Signal to Interference plus Noise Ratio (SINR), and an SINR that satisfies a target Modulation and Coding Scheme (MCS) level.

12. The apparatus of claim 7, wherein the multi-carrier system comprises a system including a restriction such that resources to be allocated to one MS are consecutive in a frequency domain.

* * * * *